US010889025B2

(12) United States Patent
Samejima et al.

(10) Patent No.: US 10,889,025 B2
(45) Date of Patent: Jan. 12, 2021

(54) METHOD FOR MANUFACTURING FIBER-REINFORCED RESIN MOLDING MATERIAL, AND DEVICE FOR MANUFACTURING FIBER-REINFORCED RESIN MOLDING MATERIAL

(71) Applicant: Mitsubishi Chemical Corporation, Chiyoda-ku (JP)

(72) Inventors: Tadao Samejima, Chiyoda-ku (JP); Yukihiro Mizutori, Chiyoda-ku (JP); Yasushi Watanabe, Chiyoda-ku (JP); Junji Kanehagi, Chiyoda-ku (JP); Masatoshi Kamata, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 82 days.

(21) Appl. No.: 15/970,935

(22) Filed: May 4, 2018

(65) Prior Publication Data
US 2018/0250849 A1    Sep. 6, 2018

Related U.S. Application Data

(63) Continuation of application No. PCT/JP2016/088441, filed on Dec. 22, 2016.

(30) Foreign Application Priority Data

Dec. 25, 2015  (JP) ................................ 2015-254771
Apr. 11, 2016  (JP) ................................ 2016-079159

(51) Int. Cl.
*B29C 70/12*    (2006.01)
*B29C 70/50*    (2006.01)
(Continued)

(52) U.S. Cl.
CPC ............ *B29B 15/122* (2013.01); *B29C 70/12* (2013.01); *B29C 70/502* (2013.01); *C08J 5/24* (2013.01);
(Continued)

(58) Field of Classification Search
CPC ....... B29B 15/10; B29B 15/122; B29C 70/12; B29C 70/50; B29C 70/502; B29C 70/504;
(Continued)

(56) References Cited

U.S. PATENT DOCUMENTS

| 5,001,172 A | 3/1991 | Tsuchiya et al. |
| 5,001,956 A | 3/1991 | Nitsch |

(Continued)

FOREIGN PATENT DOCUMENTS

| CN | 102958657 A | 3/2013 |
| EP | 3 321 054 A1 | 5/2018 |

(Continued)

OTHER PUBLICATIONS

Combined Chinese Office Action and Search Report dated Aug. 5, 2019, in Patent Application No. 201680074834.4, 16 pages (with unedited computer generated English translation).

(Continued)

*Primary Examiner* — Michael A Tolin
(74) *Attorney, Agent, or Firm* — Oblon, McClelland, Maier & Neustadt, L.L.P.

(57) ABSTRACT

Provided is a method for manufacturing a fiber-reinforced resin molding material having excellent productivity at low cost for manufacturing a fiber-reinforced resin molded article having excellent strength properties. Provided is a method for manufacturing a sheet-shaped fiber-reinforced resin molding material containing a plurality of cut fiber bundles and a resin impregnated between filaments of the cut fiber bundles, the method comprising an integrated
(Continued)

material manufacturing step for obtaining an integrated material by collecting a sheet-shaped fiber bundle aggregate obtained by arranging and spreading a plurality of consecutive fiber bundles in a width direction.

6 Claims, 8 Drawing Sheets

(51) Int. Cl.
*C08J 5/24* (2006.01)
*D01D 11/02* (2006.01)
*D02J 1/18* (2006.01)
*D04H 1/4218* (2012.01)
*D04H 1/4242* (2012.01)
*B29B 15/12* (2006.01)
*D02J 3/02* (2006.01)
*B29K 105/12* (2006.01)
*B29K 63/00* (2006.01)
*B29K 307/04* (2006.01)

(52) U.S. Cl.
CPC ............... *D01D 11/02* (2013.01); *D02J 1/18* (2013.01); *D02J 3/02* (2013.01); *B29K 2063/00* (2013.01); *B29K 2105/12* (2013.01); *B29K 2307/04* (2013.01); *D04H 1/4218* (2013.01); *D04H 1/4242* (2013.01); *D10B 2101/06* (2013.01); *D10B 2101/12* (2013.01)

(58) Field of Classification Search
CPC .............. B29C 70/508; B29K 2105/12; B29K 2307/04; B29K 2309/08; B32B 5/26; B65H 51/005; C08J 5/042; C08J 5/043; C08J 5/24; D01D 11/02; D02J 1/18; D04H 1/4218; D04H 1/4226; D04H 1/4242; D04H 1/70; D04H 1/72
See application file for complete search history.

(56) References Cited

U.S. PATENT DOCUMENTS

| 6,385,828 | B1 | 5/2002 | Kiss et al. | |
| 6,508,906 | B1* | 1/2003 | Bradish | B29C 70/086 |
| | | | | 156/285 |
| 7,571,524 | B2* | 8/2009 | Kawabe | B29C 70/20 |
| | | | | 28/282 |
| 2012/0213997 | A1 | 8/2012 | Wang et al. | |
| 2013/0106014 | A1 | 5/2013 | Ishibashi et al. | |
| 2015/0203642 | A1 | 7/2015 | Sonoda et al. | |
| 2015/0273736 | A1 | 10/2015 | Schneider et al. | |
| 2015/0292145 | A1 | 10/2015 | Sonoda et al. | |
| 2018/0194082 | A1 | 7/2018 | Samejima et al. | |
| 2018/0257265 | A1 | 9/2018 | Mizutori et al. | |

FOREIGN PATENT DOCUMENTS

| EP | 3 395 551 A1 | 10/2018 |
| JP | 1-163219 A | 6/1989 |
| JP | 2-175729 A | 7/1990 |
| JP | 8-192424 A | 7/1996 |
| JP | 2006-219780 | 8/2006 |
| JP | 2008-254191 | 10/2008 |
| JP | 2009-191238 | 8/2009 |
| JP | 2010-163536 A | 7/2010 |
| JP | 2011-241494 | 12/2011 |
| JP | 2011-241494 A | 12/2011 |
| JP | 2013-133378 A | 7/2013 |
| JP | 2014-210991 A | 11/2014 |
| WO | WO 2014/021315 A1 | 2/2014 |
| WO | WO 2014/067763 A1 | 5/2014 |
| WO | WO 2014/208626 A1 | 12/2014 |
| WO | WO 2016/043037 A1 | 3/2016 |
| WO | WO 2016/104154 A1 | 6/2016 |
| WO | WO 2016/136812 A1 | 9/2016 |
| WO | WO 2017/006989 A1 | 1/2017 |
| WO | WO 2017/110912 A1 | 6/2017 |

OTHER PUBLICATIONS

Extended Search Report dated Dec. 3, 2018 in European Patent Application No. 16878942.8.
International Search Report dated Apr. 4, 2017 in PCT/JP2016/088441, filed Dec. 22, 2016 (with English translation).
Office Action dated Apr. 17, 2020 issued in co-pending U.S. Appl. No. 15/741,615, 13 pages.
International Search Report dated Aug. 30, 2016 in PCT/JP2016/070117 (with English translation), 4 pages.
Japanese Office Action dated May 26, 2020 in Japanese Patent Application No. 2017-133132 (with English translation), 8 pages.
Office Action dated Jan. 7, 2020 in co-pending U.S. Appl. No. 15/741,615, 8 pages.
Extended European Search Report dated Jul. 24, 2018 in European Patent Application No. 16821457.5, 7 pages.
Japan Society for Composite Materials, Composite Materials handbook, 1st edition, The Nikkan Kogyo Shimbun, Ltd. 1989, pp. 553-561 (with English translation).
PCT Notification dated Nov. 8, 2017 in PCT/JP2016/070117, 6 pages.
Japanese Office Action dated Aug. 15, 2017 in Japanese Patent Application No. 2016-548745 (with partial English translation), 48 pages.
Extended Search Report dated Sep. 14, 2020, in European patent application No. 20178020.2 (5 pages).

* cited by examiner

METHOD FOR MANUFACTURING FIBER-REINFORCED RESIN MOLDING MATERIAL, AND DEVICE FOR MANUFACTURING FIBER-REINFORCED RESIN MOLDING MATERIAL

The present application is a continuation application of International application No. PCT/JP2016/088441, filed on Dec. 22, 2016, which claims the priority of Japanese Patent Application No. 2015-254771 filed on Dec. 25, 2015 and Japanese Patent Application No. 2016-079159 filed on Apr. 11, 2016, the contents of which are incorporated herein by reference.

TECHNICAL FIELD

The present invention relates to a method for manufacturing a fiber-reinforced resin molding material and a device for manufacturing a fiber-reinforced resin molding material.

BACKGROUND ART

A sheet molding compound (SMC) is a fiber-reinforced resin molding material obtained by impregnating a sheet-shaped fiber bundle group, which is formed by a plurality of fiber bundles in which elongated reinforcement fibers such as glass fibers or carbon fibers are cut into a predetermined length, with a thermosetting resin such as an unsaturated polyester resin.

The SMC is used as an intermediate material for obtaining a molded article and has a property that the SMC is easy to flow at the time of molding using a die. For this reason, the SMC is suitably used when a part having a partially different thickness, a rib, a boss, and the like in a molded article are formed.

The SMC is manufactured, for example, by the following method.

A paste containing a thermosetting resin is coated on a sheet-shaped carrier to be conveyed in one direction to thereby form a strip-shaped resin sheet. An elongated fiber bundle is sprayed on the moving resin sheet while being cut into a predetermined length to form a sheet-shaped fiber bundle group. The resin sheet is further laminated on the sheet-shaped fiber bundle group, and a laminated body thus formed is pressurized from both sides to impregnate the sheet-shaped fiber bundle group with the resin, thereby obtaining the SMC.

A fiber bundle having a large number of filaments, which is relatively inexpensive and called a large tow, is often used in manufacturing of the SMC in order to reduce manufacturing cost. In the case of using the fiber bundle having a large number of filaments, a method is known in which the fiber bundle is spread in a width direction by opening, the opened fiber bundle is separated to be split into a plurality of fiber bundles, and the separated fiber bundles are cut (for example, Patent Literature 1 and Patent Literature 2).

However, particularly, since it takes a time to open the fiber bundle having a large number of filaments such as a large tow, a problem arises in that productivity in manufacturing of the SMC using the opened fiber bundle is low.

CITATION LIST

Patent Literature

Patent Literature 1: US 2012/0213997 A
Patent Literature 2: JP 2006-219780 A

SUMMARY OF THE INVENTION

Problem to be Solved by the Invention

An object of the invention is to provide a method for manufacturing a fiber-reinforced resin molding material, the method having excellent productivity at low cost, being capable of being suitably applied to a fiber bundle having a large number of filaments, called a large tow, and being also excellent in strength properties of a fiber-reinforced resin material molded article to be obtained.

Means for Solving Problem

The invention has the following configurations.

[1] A method for manufacturing a sheet-shaped fiber-reinforced resin molding material containing a plurality of cut fiber bundles and a resin impregnated between filaments of the cut fiber bundles, the method including:
an integrated material manufacturing step for obtaining an integrated material by collecting a sheet-shaped fiber bundle aggregate obtained by arranging and spreading a plurality of consecutive fiber bundles in a width direction.

[2] The method for manufacturing a fiber-reinforced resin molding material described in [1], further including, subsequent to the integrated material manufacturing step:
a spraying step for drawing the fiber bundle aggregate out from the integrated material, obtaining the cut fiber bundles by cutting at an interval in a longitudinal direction thereof, and spraying the plurality of cut fiber bundles in a sheet shape on a first resin sheet containing a first resin to form a sheet-shaped fiber bundle group; and
a pasting and impregnating step for laminating and pressurizing a second resin sheet containing a second resin on the sheet-shaped fiber bundle group and impregnating the sheet-shaped fiber bundle group with the first resin and the second resin to obtain a fiber-reinforced resin molding material.

[3] The method for manufacturing a fiber-reinforced resin molding material described in [1] or [2], in which in the integrated material manufacturing step, the fiber bundle aggregate is split in the width direction by separation and then collected.

[4] The method for manufacturing a fiber-reinforced resin molding material described in [3], in which the separation is performed by intermittent separation at a predetermined interval in the longitudinal direction of the consecutive fiber bundle.

[5] The method for manufacturing a fiber-reinforced resin molding material described in [4], in which the intermittent separation in the longitudinal direction of the consecutive fiber bundle is performed such that a condition of Formula (1) described below is satisfied and the cut fiber bundles are obtained by cutting the consecutive fiber bundle at an interval in the longitudinal direction.

$$1 \le a/L \tag{1}$$

(provided that, in the above Formula (1), a represents a length of a separated part in the consecutive fiber bundle and L represents an interval at which the consecutive fiber bundle is cut.)

[6] The method for manufacturing a fiber-reinforced resin molding material described in [5], in which the separation and the cutting are performed such that a condition of Formula (2) described below is satisfied.

$$a/L \le 10 \tag{2}$$

(provided that, in the above Formula (2), a represents a length of a separated part in the consecutive fiber bundle and L represents an interval at which the consecutive fiber bundle is cut.)

[7] The method for manufacturing a fiber-reinforced resin molding material described in [4], in which the intermittent separation in the longitudinal direction of the consecutive fiber bundle is performed such that a condition of Formula (3) described below is satisfied and the cut fiber bundles are obtained by cutting the consecutive fiber bundle at an interval in the longitudinal direction.

$$0.9 \leq a/(a+b) < 1 \quad (3)$$

(provided that, in the above Formula (3), a represents a length of a separated part in the consecutive fiber bundle and b represents a length between intermittently separated parts in the consecutive fiber bundle.)

[8] The method for manufacturing a fiber-reinforced resin molding material described in any one of [1] to [7], in which the fiber bundle aggregate is guided by a godet roll and the fiber bundle aggregate is split in the width direction by separation and then collected.

[9] The method for manufacturing a fiber-reinforced resin molding material described in any one of [1] to [8], in which each of the fiber bundle aggregates is drawn out from a plurality of the integrated materials, each of the drawn fiber bundle aggregates is superimposed, and the cut fiber bundles are obtained by cutting at an interval in the longitudinal direction thereof.

[10] The method for manufacturing a fiber-reinforced resin molding material described in [9], in which each of the fiber bundle aggregates drawn out from the plurality of the integrated materials is superimposed while being deviated in the width direction of each of the fiber bundle aggregates, and the cut fiber bundles are obtained by cutting at an interval in the longitudinal direction thereof.

[11] A device for manufacturing a sheet-shaped fiber-reinforced resin molding material containing a plurality of cut fiber bundles and a resin impregnated between filaments of the cut fiber bundles, the device including:
a first manufacturing device,
in which the first manufacturing device includes
an arranging unit that arranges a plurality of consecutive fiber bundles in a width direction, and
an integrating unit that collects a sheet-shaped fiber bundle aggregate obtained from the plurality of arranged consecutive fiber bundles.

[12] The device for manufacturing a fiber-reinforced resin molding material described in [11], further including:
a second manufacturing device,
in which the second manufacturing device includes
a cutting machine that draws the fiber bundle aggregate out from an integrated material obtained by the integrating unit and cutting at an interval in a longitudinal direction thereof is performed to produce the cut fiber bundles, and
an impregnating unit that laminates and pressurizes a second resin sheet containing a second resin on a sheet-shaped fiber bundle group formed by spraying the plurality of cut fiber bundles in a sheet shape on a first resin sheet containing a first resin, and impregnates the sheet-shaped fiber bundle group with the first resin and the second resin to obtain a fiber-reinforced resin molding material.

Effect of the Invention

According to the method for manufacturing a fiber-reinforced resin molding material and the device for manufacturing a fiber-reinforced resin molding material of the invention, it is possible to manufacture a fiber-reinforced resin molding material at low cost with high productivity, and by opening the fiber bundle in a flat state and separating the opened fiber bundle, it is possible to obtain a fiber-reinforced resin molding material having less eccentrically-located part of the resin and excellent strength properties of a fiber-reinforced resin material molded article to be obtained.

Further, the method for manufacturing a fiber-reinforced resin molding material and the device for manufacturing a fiber-reinforced resin molding material of the invention are useful particularly in the case of using a fiber bundle having a large number of filaments, called a large tow.

MODE(S) FOR CARRYING OUT THE INVENTION

Figure 1:
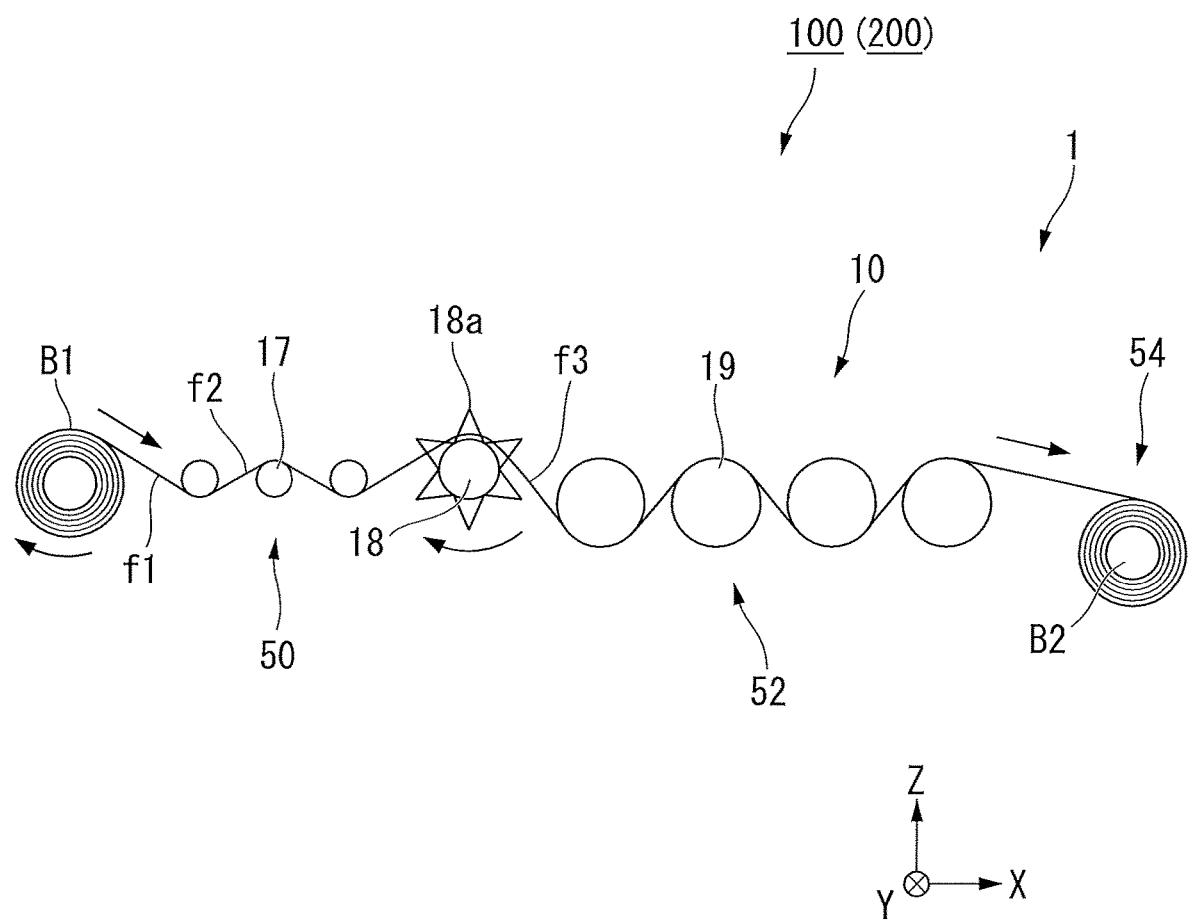
FIG. 1 is a schematic configuration diagram illustrating an exemplary step of a method for manufacturing a fiber-reinforced resin molding material and a part of a manufacturing device of the invention.

A method for manufacturing a fiber-reinforced resin molding material of the invention is a method involved in manufacturing of a sheet-shaped fiber-reinforced resin molding material (SMC) containing a plurality of cut fiber bundles and a resin impregnated between filaments of the cut fiber bundles.

The method for manufacturing a fiber-reinforced resin molding material of the invention includes the following integrated material manufacturing step. In addition, the method for manufacturing a fiber-reinforced resin molding material of the invention may include, subsequent to the integrated material manufacturing step, the following spraying step and pasting and impregnating step.

Integrated Material Manufacturing Step:

The integrated material manufacturing step is a step for obtaining an integrated material by collecting a sheet-shaped fiber bundle aggregate obtained by arranging and spreading a plurality of consecutive fiber bundles in a width direction.

The consecutive fiber bundles are spread in the width direction by opening to form a sheet-shaped fiber bundle aggregate in a flat state. This sheet-shaped fiber bundle aggregate is collected to obtain an integrated material.

Spraying Step:

The spraying step is a step for drawing the fiber bundle aggregate out from the integrated material obtained in the integrated material manufacturing step, performing cutting at an interval in a longitudinal direction of the fiber bundle aggregate to obtain cut fiber bundles, and spraying the plurality of cut fiber bundles in a sheet shape on a first resin sheet containing a first resin to form a sheet-shaped fiber bundle group.

The fiber bundle aggregate drawn out from the integrated material is consecutively cut in the width direction at a predetermined interval in the longitudinal direction. The cut fiber bundles thus obtained are sprayed on the first resin sheet containing a first resin to form a sheet-shaped fiber bundle group in a shape of the first resin sheet.

Pasting and Impregnating Step:

The pasting and impregnating step is a step for laminating and pressurizing a second resin sheet containing a second resin on the sheet-shaped fiber bundle group obtained by the spraying step and impregnating the sheet-shaped fiber bundle group with the first resin contained in the first resin sheet and the second resin contained in the second resin sheet to obtain a fiber-reinforced resin molding material.

By pasting the second resin sheet onto the sheet-shaped fiber bundle group and pressurizing a laminated body obtained by laminating the first resin sheet, the sheet-shaped fiber bundle group, and the second resin sheet in this order, the sheet-shaped fiber bundle group is impregnated with the resins to obtain a fiber-reinforced resin molding material.

The method for manufacturing a fiber-reinforced resin molding material of the invention is characterized by including the integrated material manufacturing step.

That is, the method for manufacturing a fiber-reinforced resin molding material of the invention is characterized in that the sheet-shaped fiber bundle aggregate obtained by arranging and spreading a plurality of consecutive fiber bundles in the width direction is collected once to obtain an integrated material (the integrated material manufacturing step), and the fiber bundle aggregate is drawn out from the obtained integrated material and then used.

By having the integrated material manufacturing step in which the integrated material is collected, it is possible to individually control a process speed of the integrated material manufacturing step and process speeds of the spraying step and the pasting and impregnating step. Therefore, the opening operation of the fiber bundle becomes a rate-determining process, and thus it is possible to suppress a decrease in the process speeds of the spraying step and the pasting and impregnating step.

Therefore, according to the method for manufacturing a fiber-reinforced resin molding material of the invention, it is possible to manufacture a fiber-reinforced resin molding material with high productivity.

Hereinafter, the method for manufacturing a fiber-reinforced resin molding material and the device for manufacturing a fiber-reinforced resin molding material of the invention will be described on the basis of several specific embodiments. The following embodiments are merely examples provided for describing the invention, and the invention is not intended to be limited thereto. The invention may be carried out in various embodiments without departing from the spirit of the invention.

Incidentally, in the following description, an XYZ orthogonal coordinate system is appropriately set, and as necessary, while referring to this XYZ orthogonal coordinate system, positional relationships between respective members will be described.

First Embodiment

An example of each of the method for manufacturing a fiber-reinforced resin molding material and the device for manufacturing a fiber-reinforced resin molding material of the invention will be described with reference to FIG. 1 and FIG. 2.

(Device for Manufacturing Fiber-Reinforced Resin Molding Material)

A device for manufacturing a fiber-reinforced resin molding material 100 of the present embodiment (hereinafter, also simply referred to as the "manufacturing device 100") includes a first manufacturing device 1 and a second manufacturing device 2.

The first manufacturing device 1 includes an opening and separating unit 10 corresponding to an arranging unit which arranges a plurality of elongated, that is, consecutive fiber bundles drawn out from a bobbin B1 in the width direction.

The opening and separating unit 10 includes an opening unit 50 which opens a consecutive fiber bundle f1 in the width direction (Y-axis direction), a separating unit 52 which separates the opened fiber bundle f2 into a separated fiber bundle f3, and a collecting unit 54 which collects the separated fiber bundle f3.

That is, in the present embodiment, the separated fiber bundle f3 is collected as a fiber bundle aggregate in the collecting unit to form an integrated material.

The opening unit 50 includes a plurality of opening bars 17 which are arranged and provided at an interval in an X-axis direction.

The plurality of opening bars 17 are configured to spread the consecutive fiber bundle f1 in the width direction by a means, such as heating, abrasion, or shaking, of each opening bar 17 when the plurality of consecutive fiber bundles f1 sequentially pass above and below each opening bar 17 in a zig-zag manner. When the consecutive fiber bundle f1 is opened, the opened, that is, flat consecutive fiber bundle f2 is obtained.

The separating unit 52 includes a plurality of rotary blades 18 and a plurality of godet rolls 19.

The plurality of rotary blades 18 are arranged at a predetermined interval in the width direction (Y-axis direction) of the opened fiber bundle f2. In addition, a plurality of blades 18a are provided to be continuously arranged in a circumferential direction in each rotary blade 18. When the opened fiber bundle f2 is caused to pass through the rotary blade 18 while the rotary blade 18 is rotated, the plurality of blades 18a are intermittently stuck in the opened fiber bundle f2, and the opened fiber bundle f2 is split in the width direction to obtain the separated fiber bundles f3. However, the separated fiber bundles f3 are not in a state of being completely separated but are a fiber bundle aggregate in a state of being partially unseparated (being coupled), and the consecutive fiber bundles are in a state of being intermittently separated at a predetermined interval in the longitudinal direction.

The plurality of godet rolls 19 guide the separated fiber bundle f3 to the collecting unit 54.

The collecting unit 54 is configured to wind the separated fiber bundle f3 that is a sheet-shaped fiber bundle aggregate up a bobbin B2 so that the fiber bundle f3 can be collected as an integrated material.

The second manufacturing device 2 includes a first carrier sheet supplying unit 11, a first conveying unit 20, a first coating unit 12, a cutting machine 13, a second carrier sheet supplying unit 14, a second conveying unit 28, a second coating unit 15, and an impregnating unit 16.

The first carrier sheet supplying unit 11 supplies an elongated, that is, consecutive first carrier sheet C1 drawn out from a first original sheet roll R1 to the first conveying unit 20. The first conveying unit 20 includes a conveyer 23 in which an endless belt 22 is looped over between a pair of pulleys 21a and 21b. In the conveyer 23, the endless belt 22 is revolved by rotating the pair of pulleys 21a and 21b in the same direction so that the first carrier sheet C1 is conveyed on the surface of the endless belt 22 to the right side in the X-axis direction.

The first coating unit 12 is positioned immediately above the first conveying unit 20 at the pulley 21a side, and includes a coater 24 supplying a paste P containing a thermosetting resin that is a first resin. When the first carrier sheet C1 passes through the coater 24, the paste P is coated on the surface of the first carrier sheet C1 in a predetermined thickness (0.05 mm to 0.8 mm, preferably 0.1 mm to 0.7 mm, more preferably 0.15 mm to 0.6 mm) to form a first resin sheet S1 containing the first resin. The first resin sheet S1 is moved according to the conveyance of the first carrier sheet C1.

The cutting machine 13 is positioned above the first carrier sheet C1 in the latter stage of the conveyance direction in relation to the first coating unit 12. A guide roll 38, which guides the separated fiber bundle f3, which has been drawn out from the integrated material wound up the bobbin B2 and collected, to the cutting machine 13, is provided in the previous stage of the cutting machine 13.

Regarding the integrated material, a plurality of integrated materials may be installed in the Y direction and each of fiber bundle aggregates (separated fiber bundles f3) may be drawn out from each of the integrated materials and be guided to the cutting machine 13. In this case, it is preferable to install each integrated material to each roll and draw each fiber bundle aggregate out from each integrated material compared to a case where each integrated material is installed to the same roll and then each fiber bundle aggregate is drawn out from each integrated material. In this example, in a case where a plurality of the bobbins B2 in which the separated fiber bundle f3 has been collected are installed in the Y direction, it is preferable that these bobbins B2 are respectively installed to individual rolls and then the separated fiber bundle f3 is drawn out. According to this, even when the lengths of the fiber bundles in the respective integrated materials are different to each other, it is possible to easily perform a replacement operation or the like in each of the individual rolls.

The cutting machine 13 cuts the separated fiber bundle f3, which has been drawn out from the integrated material wound up the bobbin B2 and collected once, at an interval in the longitudinal direction of the fiber bundle aggregate (separated fiber bundle f3) so as to consecutively cut the fiber bundle in a predetermined length, thereby producing the cut fiber bundle, and includes a guide roll 25, a pinch roll 26, and a cutter roll 27. The guide roll 25 guides the separated fiber bundle f3, which has been supplied, to the lower side while rotating. The pinch roll 26 rotates in a direction opposite to that of the guide roll 25 while pinching the separated fiber bundle f3 between the pinch roll 26 and the guide roll 25. According to this, the separated fiber bundle f3 is drawn out from the integrated material wound up the bobbin B2. The cutter roll 27 cuts the separated fiber bundle f3 at an interval in the longitudinal direction of the fiber bundle aggregate (separated fiber bundle f3) to have a predetermined length while rotating. The fiber bundles f4 cut in a predetermined length by the cutting machine 13 are dropped and sprayed on the first resin sheet S1 containing the first resin to form a sheet-shaped fiber bundle group F on the first resin sheet.

The second carrier sheet supplying unit 14 supplies an elongated, that is, consecutive second carrier sheet C2 drawn out from a second original sheet roll R2 to the second conveying unit 28. The second conveying unit 28 is positioned above the first carrier sheet C1 conveyed by the conveyer 23 and includes a plurality of guide rolls 29. The second conveying unit 28 conveys the second carrier sheet C2 supplied from the second carrier sheet supplying unit 14 to a direction (the left side in the X-axis direction) opposite to that of the first carrier sheet C1, and then the conveyance direction is inverted to the same direction as that of the first carrier sheet C1 by the plurality of guide rolls 29.

The second coating unit 15 is positioned immediately above the second carrier sheet C2 which is being conveyed in a direction opposite to that of the first carrier sheet C1, and includes a coater 30 supplying a paste P containing a thermosetting resin that is a second resin. When the second carrier sheet C2 passes through the coater 30, the paste P is coated on the surface of the second carrier sheet C2 in a predetermined thickness (0.05 mm to 0.8 mm, preferably 0.1 mm to 0.7 mm, more preferably 0.15 mm to 0.6 mm) to form a second resin sheet S2 containing the second resin. The second resin sheet S2 is moved according to the conveyance of the second carrier sheet C2.

Incidentally, the first resin and the second resin may be the same as or different from each other, and are preferably the same as each other.

The impregnating unit 16 is positioned in the latter stage in the first conveying unit 20 in relation to the cutting machine 13, includes a pasting mechanism 31 and a pressurization mechanism 32, laminates and pressurizes the second resin sheet S2 containing the second resin on the sheet-shaped fiber bundle group formed by spraying the plurality of cut fiber bundles f4 in a sheet shape on the first resin sheet S1 containing the first resin, and impregnates the sheet-shaped fiber bundle group with the first resin and the second resin to obtain a fiber reinforced resin material.

The pasting mechanism 31 is positioned above the pulley 21b of the conveyer 23 and includes a plurality of pasting rolls 33. The plurality of pasting rolls 33 are arranged in the conveyance direction in a state of being in contact with the back surface of the second carrier sheet C2 on which the second resin sheet S2 is formed. In addition, the plurality of pasting rolls 33 are disposed such that the second carrier sheet C2 gradually comes close to the first carrier sheet C1.

In the pasting mechanism 31, the first carrier sheet C1 and the second carrier sheet C2 are superimposed in a state where the first resin sheet S1, the sheet-shaped fiber bundle group F, and the second resin sheet S2 are interposed therebetween, and then the first carrier sheet C1 and the second carrier sheet C2 are conveyed while being pasted. According to this, a laminated body is formed in which the first resin sheet S1, the sheet-shaped fiber bundle group F, and the second resin sheet S2 are laminated in this order from the bottom. Herein, a sheet obtained by pasting the first carrier sheet C1 and the second carrier sheet C2 in a state where the first resin sheet S1, the sheet-shaped fiber bundle group F, and the second resin sheet S2 are interposed therebetween is referred to as a pasted sheet S3.

The pressurization mechanism 32 is positioned in the latter stage in the pasting mechanism 31 and includes a lower conveyer 36A in which an endless belt 35a is looped over between a pair of pulleys 34a and 34b and an upper conveyer 36B in which an endless belt 35b is looped over between a pair of pulleys 34c and 34d. The lower conveyer 36A and the upper conveyer 36B are disposed to face each other in a state where the endless belts 35a and 35b of the lower and upper conveyers are butted.

In the pressurization mechanism 32, the endless belt 35a is revolved by rotating the pair of pulleys 34a and 34b of the lower conveyer 36A in the same direction. In addition, in the pressurization mechanism 32, the endless belt 35b is revolved inversely at the same speed as that of the endless belt 35a by rotating the pair of pulleys 34c and 34d of the upper conveyer 36B in the same direction. According to this, the pasted sheet S3 interposed between the endless belts 35a and 35b is conveyed to the right side in the X-axis direction.

In the pressurization mechanism 32, a plurality of lower rolls 37a and a plurality of upper rolls 37b are further provided. The plurality of lower rolls 37a are arranged in the conveyance direction in the state of being in contact with the back surface of the butted part of the endless belt 35a. Similarly, the plurality of upper rolls 37b are arranged in the conveyance direction in a state of being in contact with the back surface of the butted part of the endless belt 35b. In addition, the plurality of lower rolls 37a and the plurality of upper rolls 37b are alternately arranged along the conveyance direction of the pasted sheet S3.

In the pressurization mechanism 32, during the pasted sheet S3 passes between the endless belts 35a and 35b, the first resin sheet S1, the sheet-shaped fiber bundle group F, and the second resin sheet S2 interposed between the first carrier sheet C1 and the second carrier sheet C2 are pressurized by the plurality of lower rolls 37a and the plurality of upper rolls 37b. At this time, the sheet-shaped fiber bundle group F is impregnated with the first resin contained in the first resin sheet S1 and the second resin contained in the second resin sheet S2. According to this, an original sheet R of the fiber-reinforced resin molding material is obtained. The original sheet R can be used for molding by being cut in a predetermined length. Incidentally, the first carrier sheet C1 and the second carrier sheet C2 are peeled off from the fiber-reinforced resin molding material before molding of the fiber-reinforced resin molding material.

(Method for Manufacturing Fiber-Reinforced Resin Molding Material)

Hereinafter, a case where the manufacturing device 100 is used will be described as an example of the method for manufacturing a fiber-reinforced resin molding material of the invention.

<Integrated Material Manufacturing Step>

In the first manufacturing device 1, the consecutive fiber bundle f1 is drawn out from the bobbin B1, and the consecutive fiber bundle f1 is caused to sequentially pass above and below each opening bar 17 in a zig-zag manner in the opening unit 50 to obtain the opened consecutive fiber bundle f2 which is spread in the width direction by opening and is in a flat state.

The opened fiber bundle f2 is caused to pass through the plurality of rotary blades 18 while the plurality of rotary blades 18 are rotated in the separating unit 52, the plurality of blades 18a are intermittently stuck in the opened fiber bundle f2, and the opened fiber bundle f2 is split in the width direction to obtain a plurality of consecutive fiber bundles f3 that are separated. However, the separated fiber bundles f3 are not in a state of being completely separated but are a fiber bundle aggregate in a state of being partially unseparated (being coupled) and are in a state of being intermittently separated at a predetermined interval in the longitudinal direction of the consecutive fiber bundle. Subsequently, the separated fiber bundles f3 are guided to the bobbin B2 by the plurality of godet rolls 19 and collected by being wound up.

When the fiber bundle aggregate is in a state of being partially unseparated as described above, even in a case where a fiber bundle in which oblique or diagonal running is present in some of filaments is used as the consecutive fiber bundle f1, cutting of the filaments in the separated fiber bundle f3 is reduced by separation so that it is possible to suppress the winding of the separated fiber bundle f3 to a roll or the like caused by the cut filaments.

In a case where the intermittent separation in the longitudinal direction of the consecutive fiber bundle is performed, it is preferable that the intermittent separation in the longitudinal direction of the consecutive fiber bundle is performed such that a condition of Formula (1) described below is satisfied and cutting at an interval in the longitudinal direction of the consecutive fiber bundle is performed to obtain the cut fiber bundles f4.

$$1 \leq a/L \tag{1}$$

Provided that, in the above Formula (1), a represents a length of a separated part in the consecutive fiber bundle (the separated fiber bundle f3) and L represents an interval at which the fiber bundle is cut in the longitudinal direction, that is, an interval at which the consecutive fiber bundle (the separated fiber bundle f3) is cut.

The reason for this is that when the value of a/L is set to 1 or more, an unseparated part, which is not split, in each of the cut fiber bundles f4 is decreased so that dispersibility of the reinforcement fiber at the time of manufacturing of the fiber-reinforced resin molding material tends to become favorable and the quality of the fiber-reinforced resin molding material tends to become favorable.

The value of a/L is preferably 1.05 or more and more preferably 1.1 or more.

In addition, in a case where the intermittent separation in the longitudinal direction of the consecutive fiber bundle is performed, it is preferable that the cutting and separation of the fiber bundle are performed such that a condition of Formula (2) described below is satisfied.

$$a/L \leq 10 \tag{2}$$

Provided that, symbols in the above Formula (2) have the same meaning as those of the symbols in the above Formula (1).

The reason for this is that when the value of a/L is set to 10 or less, even in a case where oblique or diagonal running is present in some of filaments in the consecutive fiber bundle f1 that is a target to be separated, fluff occurrence of the cut fiber bundles f4 or occurrence of troubles in the process caused by fluff tends to be easily suppressed.

The value of a/L is preferably 8 or less and more preferably 5 or less.

Therefore, the value of a/L is preferably 1 to 10, more preferably 1.05 to 8, and further preferably 1.1 to 5.

In addition, as another embodiment, in a case where the intermittent separation in the longitudinal direction of the consecutive fiber bundle is performed, it is preferable that the intermittent separation in the longitudinal direction of the consecutive fiber bundle is performed such that a condition of Formula (3) described below is satisfied and cutting at an interval in the longitudinal direction of the consecutive fiber bundle is performed to obtain the cut fiber bundles f4.

$$0.9 \leq a/(a+b) < 1 \tag{3}$$

Provided that, in the above Formula (3), a represents a length of a separated part in the consecutive fiber bundle (the separated fiber bundle f3) and b represents a length between intermittently separated parts in the consecutive fiber bundle (the separated fiber bundle f3), that is, a length of an unseparated part between intermittently separated parts in the consecutive fiber bundle.

The reason for this is that when the value of $a/(a+b)$ is set to 0.9 or more, an unseparated part, which is not split, in each of the cut fiber bundles is decreased so that dispersibility of the reinforcement fiber at the time of manufacturing of the fiber-reinforced resin molding material tends to become favorable and the quality of the fiber-reinforced resin molding material tends to become favorable.

The value of $a/(a+b)$ is preferably 0.92 or more.

In addition, when the value of $a/(a+b)$ is set to less than 1, the intermittent separation can be performed, and it is possible to suppress the winding of the separated fiber bundle f3 to a roll or the like.

The value of $a/(a+b)$ is preferably 0.99 or less and more preferably 0.98 or less.

Therefore, the value of $a/(a+b)$ is preferably 0.9 or more and less than 1, more preferably 0.9 or more and 0.99 or less, and further preferably 0.92 or more and 0.98 or less.

When the consecutive fiber bundles f3 that are separated are wound up the bobbin B2, winding may be performed by superimposing paper or a film on the separated fiber bundle f3. According to this, since paper or a film is inserted between the separated fiber bundles f3 to be wound up the bobbin B2, it is easy to suppress a case in which fibers of the separated fiber bundle f3 to be wound up are entangled and thus the fiber bundle f3 is difficult to draw out.

As the consecutive fiber bundle used in the method for manufacturing a fiber-reinforced resin molding material of the invention, a carbon fiber bundle is preferably used. Incidentally, as the consecutive fiber bundle, a glass fiber bundle may be used.

In addition, as the consecutive fiber bundle, for example, a fiber bundle formed of filaments having the number of fibers of 3,000 or more can be used, and a fiber bundle having the number of filaments of 12,000 or more can be suitably used. Further, as the consecutive fiber bundle, a fiber bundle formed of 48,000 or more of filaments, called a large tow, can also be used.

In the integrated material manufacturing step, the average thickness of the fiber bundle aggregate collected as the integrated material is preferably 0.01 mm to 0.3 mm, more preferably 0.02 mm to 0.2 mm, and further preferably 0.025 mm to 0.15 mm.

When the average thickness of the fiber bundle aggregate is equal to or more than the lower limit, it is possible to stably open the fiber bundle aggregate, and when the average thickness thereof is equal to or less than the upper limit, the fiber-reinforced resin molding material has a physical property of high strength.

Incidentally, the average thickness of the fiber bundle aggregate is measured by a microgauge.

In the integrated material manufacturing step, the width of the fiber bundle aggregate collected as the integrated material is preferably 0.5 mm to 50 mm, more preferably 1 mm to 40 mm, and further preferably 2 mm to 25 mm.

When the width of the fiber bundle aggregate is equal to or more than the lower limit, flowability of the fiber-reinforced resin molding material becomes favorable, and when the width thereof is equal to or less than the upper limit, the fiber-reinforced resin molding material has a physical property of high strength.

<Spraying Step>

In the second manufacturing device 2, the elongated, that is, consecutive first carrier sheet C1 is drawn out from the first original sheet roll R1 and supplied to the first conveying unit 20 by the first carrier sheet supplying unit 11, and the paste P containing the first resin is coated in a predetermined thickness by the first coating unit 12 to form the first resin sheet S1 containing the first resin. The first resin sheet S1 on the first carrier sheet C1 is moved by conveying the first carrier sheet C1 by the first conveying unit 20.

A thermosetting resin that is the first resin contained in the paste P is not particularly limited, and for example, an unsaturated polyester resin and the like are exemplified. A filler such as calcium carbonate, a shrinkage diminishing agent, a release agent, a curing initiator, a thickener, or the like may be blended with the paste P.

Further, the consecutive fiber bundles f3 that are separated are drawn out from the bobbin B2, cutting at an interval in the longitudinal direction thereof is performed in the cutting machine 13 to have a predetermined length, and the cut fiber bundles f4 are caused to be dropped and sprayed on the first resin sheet S1. According to this, a sheet-shaped fiber bundle group F in which the plurality of cut fiber bundles f4 are separated in a state of being opened and are sprayed in a random fiber orientation is consecutively formed on the moving first resin sheet S1.

In this way, the cut fiber bundles f4 are obtained by cutting the consecutive fiber bundle (separated fiber bundle f3) at an interval in the longitudinal direction thereof.

The average length of the cut fiber bundles is preferably 5 to 100 mm, more preferably 10 to 75 mm, and further preferably 20 to 60 mm.

When the average length of the cut fiber bundles is equal to or more than the lower limit, a fiber-reinforced resin material molded article having excellent physical properties such as tensile strength and elastic modulus is obtained, and when the average length thereof is equal to or less than the upper limit, the fiber-reinforced resin molding material easily flows at the time of molding so that molding is easily performed.

<Pasting and Impregnating Step>

The elongated, that is, consecutive second carrier sheet C2 is drawn out from the second original sheet roll R2 and supplied to the second conveying unit 28 by the second carrier sheet supplying unit 14. The paste P containing the second resin is coated in a predetermined thickness on the surface of the second carrier sheet C2 by the second coating unit 15 to form the second resin sheet S2 containing the second resin.

A thermosetting resin that is the second resin contained in the paste P is not particularly limited, and for example, an unsaturated polyester resin and the like are exemplified. A filler such as calcium carbonate, a shrinkage diminishing agent, a release agent, a curing initiator, a thickener, or the like may be blended with the paste P.

The second resin sheet S2 is moved by conveying the second carrier sheet C2, and in the impregnating unit 16, the second resin sheet S2 is laminated and pasted onto the sheet-shaped fiber bundle group F by the pasting mechanism 31. Then, the laminated body including the first resin sheet S1, the sheet-shaped fiber bundle group F, and the second resin sheet S2 is pressurized by the pressurization mechanism 32, and the sheet-shaped fiber bundle group F is impregnated with the first resin contained in the first resin sheet S1 and the second resin contained in the second resin sheet S2. According to this, an original sheet R of the fiber-reinforced resin molding material in which the fiber-reinforced resin molding material is interposed between the first carrier sheet C1 and the second carrier sheet C2 is obtained.

In the present embodiment, in the integrated material manufacturing step, the consecutive fiber bundle f1 is opened and the separated fiber bundle f3 (fiber bundle aggregate) is collected once to obtain an integrated material, and then, in the spraying step, the fiber bundle aggregate is drawn out from the integrated material and then used. Therefore, it is possible to control the process speeds in the spraying step and the pasting and impregnating step regardless of the process speed in the integrated material manufacturing step, and the opening operation of the fiber bundle becomes a rate-determining process so that it is possible to suppress a decrease in the process speeds in the spraying step and the pasting and impregnating step.

Further, as described above, when the cut fiber bundles f4 obtained by cutting the fiber bundle f3, which has been opened in a flat state and separated, are consecutively sprayed on the first resin sheet S1 in a random fiber orientation, a fiber-reinforced resin molding material with excellent strength properties and with less eccentrically-located part of the resin can be obtained.

Incidentally, in a case where separation of the opened fiber bundle is performed in the integrated material manufacturing step, the embodiment thereof is not limited to an embodiment in which a fiber bundle is separated, and then the separated fiber bundles are guided to a bobbin by a godet roll, like the embodiment using the manufacturing device 100.

For example, the opened fiber bundle may be guided by a godet roll and then subjected to separation, and thus the separated fiber bundles may be obtained. The embodiment in which the opened fiber bundle (fiber bundle aggregate) is guided by a godet roll and the fiber bundle aggregate is split in the width direction by separation and collected has an advantage in terms that even when fluff occurs in the fiber bundle at the time of separation, a trouble caused by the winding to a roll is less likely to occur, as compared to the embodiment in which the opened fiber bundle is separated and the separated fiber bundles are guided by a godet roll. In addition, it is easy to suppress a case where the separated fiber bundles come in close contact with each other again when being guided by the godet roll.

As for the godet roll, a roll having a mirror surface or a surface state of pearskin finish is preferable. In addition, from the viewpoint of durability, a roll plated with hard chromium is preferable.

Figure 4:
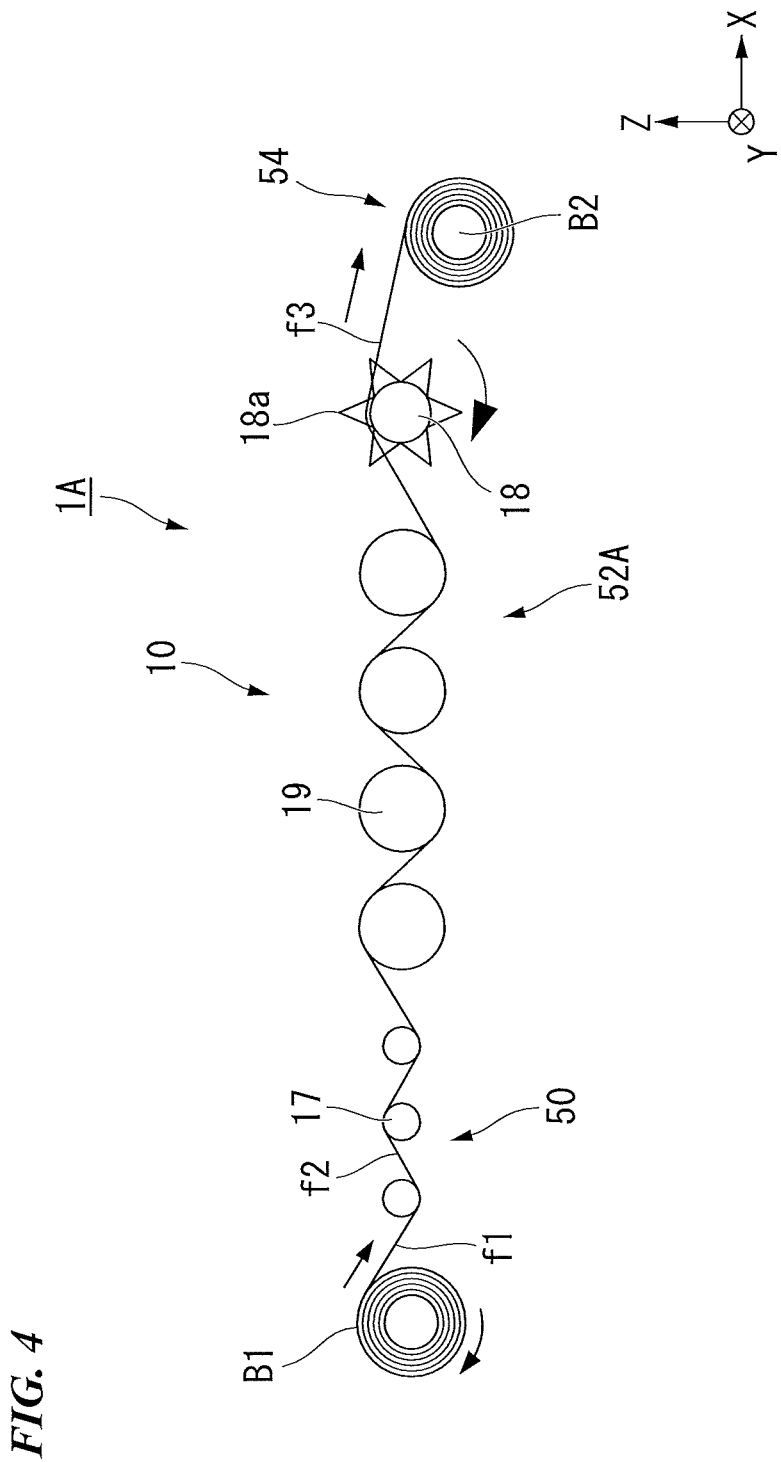
FIG. 4 is a schematic configuration diagram illustrating another exemplary step of the method for manufacturing a fiber-reinforced resin molding material and a part of the manufacturing device of the invention.

Specifically, for example, the method for manufacturing a fiber-reinforced resin molding material of the invention may be a manufacturing method using a manufacturing device in which the first manufacturing device 1 in the manufacturing device 100 is changed to a first manufacturing device 1A illustrated in FIG. 4.

Figure 2:
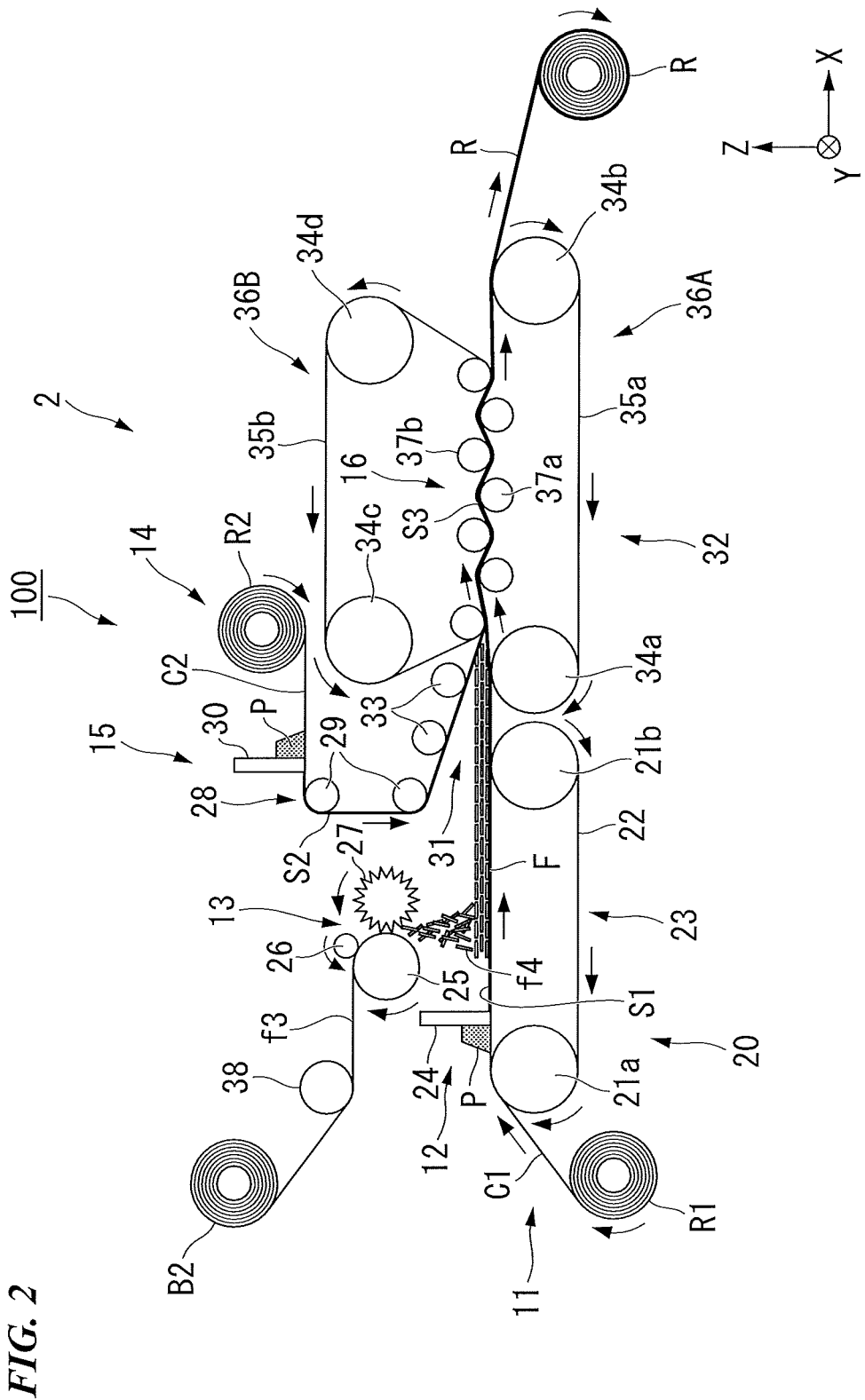
FIG. 2 is a schematic configuration diagram illustrating an exemplary step of the method for manufacturing a fiber-reinforced resin molding material and a part of the manufacturing device of the invention.

The same parts in FIG. 4 as in FIG. 1 are denoted by the same reference numerals and descriptions thereof are omitted.

The first manufacturing device 1A has the same configuration as in the first manufacturing device 1, except that a separating unit 52A is provided instead of the separating unit 52. The separating unit 52A has the same configuration as in the separating unit 52, except that the plurality of rotary blades 18 are disposed in the latter stage of the plurality of godet rolls 19.

By using such a first manufacturing device 1A, the opened fiber bundle f2 is guided to the rotary blade 18 by the godet roll 19, and the opened fiber bundle f2 is split in the width direction by separation so that the separated fiber bundles f3 can be obtained.

Second Embodiment

In the method for manufacturing a fiber-reinforced resin molding material of the invention, it is preferable that each fiber bundle aggregate is drawn out from a plurality of integrated materials obtained in the integrated material manufacturing step, each of the drawn fiber bundle aggregates is superimposed, and then cutting at an interval in the longitudinal direction thereof is performed to obtain cut fiber bundles.

(Device for Manufacturing Fiber-Reinforced Resin Molding Material)

Figure 3:
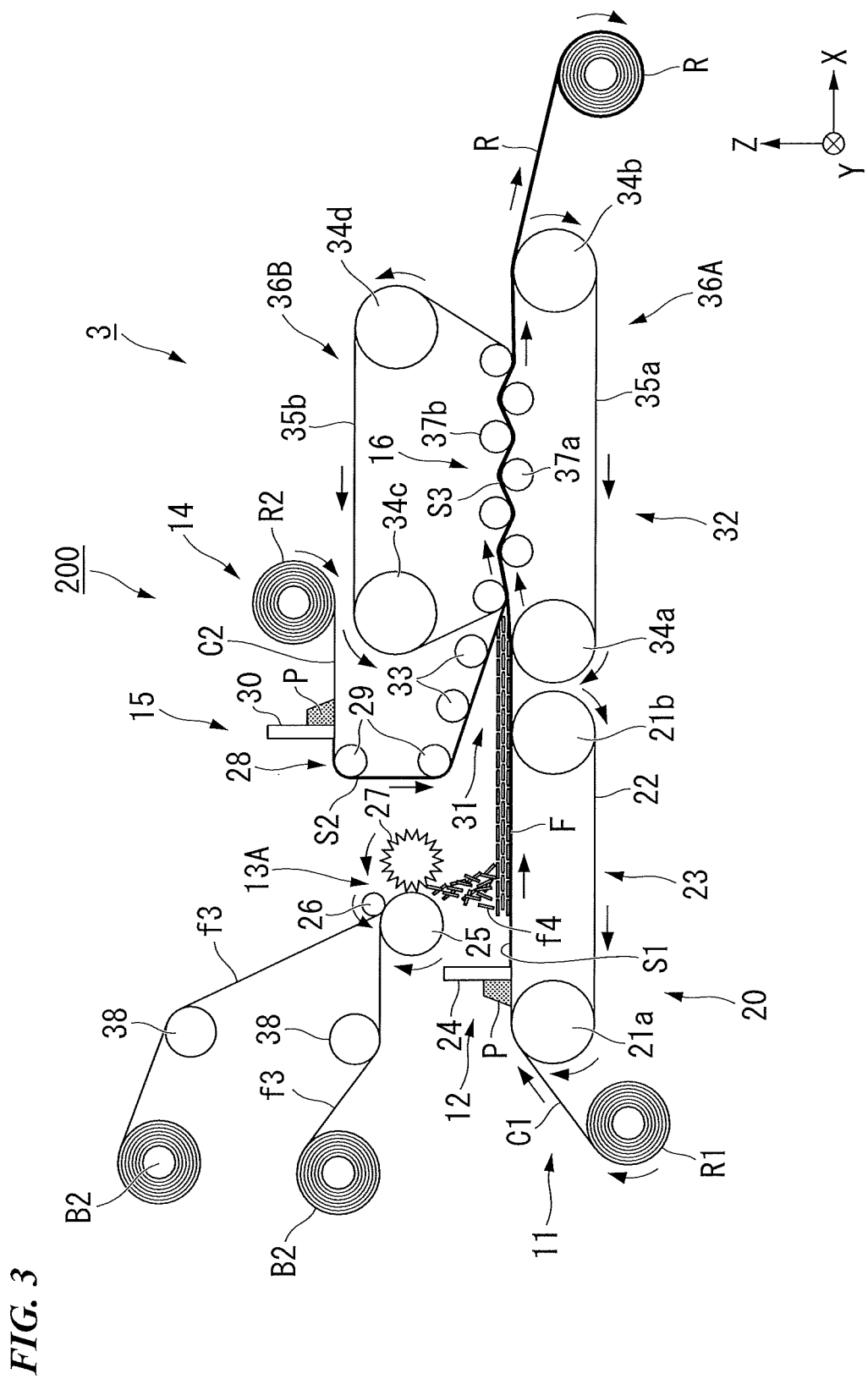
FIG. 3 is a schematic configuration diagram illustrating another exemplary step of the method for manufacturing a fiber-reinforced resin molding material and a part of the manufacturing device of the invention.

As the method for manufacturing a fiber-reinforced resin molding material of the invention in which each fiber bundle aggregate is drawn out from a plurality of integrated materials obtained in the integrated material manufacturing step, each of the drawn fiber bundle aggregates is superimposed, and then cutting at an interval in the longitudinal direction thereof is performed to obtain cut fiber bundles, for example, a method using a device for manufacturing a fiber-reinforced resin molding material 200 illustrated in FIG. 1 and FIG. 3 (hereinafter, also simply referred to as the "manufacturing device 200") is exemplified. The same parts in FIG. 3 as in FIG. 2 are denoted by the same reference numerals and descriptions thereof are omitted.

The manufacturing device 200 includes the first manufacturing device 1 and a second manufacturing device 3. That is, the manufacturing device 200 has the same configuration as in the manufacturing device 100, except that the second manufacturing device 3 is provided instead of the second manufacturing device 2.

The second manufacturing device 3 has the same configuration as in the second manufacturing device 2, except that, as illustrated in FIG. 3, the plurality of separated fiber bundles f3 are drawn out from the integrated materials collected in the plurality of bobbins B2, each of the separated fiber bundles f3 which have been drawn out is superimposed and supplied to the cutting machine 13, and the respective fiber bundle aggregates are cut at the same time.

(Method for Manufacturing Fiber-Reinforced Resin Molding Material)

Hereinafter, the case of using the manufacturing device 200 will be described as an example of the method for manufacturing a fiber-reinforced resin molding material of the invention.

<Integrated Material Manufacturing Step>

The integrated material manufacturing step in the second embodiment is performed in the same manner as in the integrated material manufacturing step in the first embodiment.

That is, in the present embodiment, the integrated material is configured by collecting the separated fiber bundles f3 as a fiber bundle aggregate in the collecting unit.

<Spraying Step>

In the second manufacturing device 3, similarly to the first embodiment, the elongated, that is, consecutive first carrier sheet C1 is drawn out from the first original sheet roll R1 and supplied to the first conveying unit 20 by the first carrier sheet supplying unit 11, and the paste P containing the first resin is coated in a predetermined thickness by the first coating unit 12 to form the first resin sheet S1 containing the first resin. The first resin sheet S1 on the first carrier sheet C1 is moved by conveying the first carrier sheet C1 by the first conveying unit 20.

Further, the plurality of consecutive fiber bundles f3 that are separated are drawn out from the plurality of bobbins B2 and superimposed, cutting at an interval in the longitudinal direction thereof is performed in the cutting machine 13 to have a predetermined length, and the cut fiber bundles f4 are caused to be dropped and sprayed on the first resin sheet S1. According to this, a sheet-shaped fiber bundle group F in which the plurality of cut fiber bundles f4 are separated in a state of being opened and are sprayed in a random fiber orientation is consecutively formed on the moving first resin sheet S1.

As described in the present embodiment, in a case where the plurality of fiber bundle aggregates each drawn out from the plurality of integrated materials in the spraying step are superimposed and cutting at an interval in the longitudinal direction thereof is performed to obtain the cut fiber bundles, it is preferable to perform cutting in a state where the plurality of fiber bundle aggregates are superimposed while the width directions thereof are deviated, as compared to an embodiment in which the plurality of fiber bundle aggregates are superimposed such that the width directions thereof are coincident with each other and then cutting is performed.

By cutting the plurality of fiber bundle aggregates in a state where the plurality of fiber bundle aggregates are superimposed while the width directions thereof are deviated, it is possible to increase the manufacturing speed and it is easy to suppress occurrence of unevenness in weight of fiber-reinforced resin molding materials to be obtained.

Factors for obtaining such an effect are considered as follows.

That is, in the plurality of fiber bundle aggregates separated by the same device, split positions in the width direction thereof are the same. For this reason, when the plurality of fiber bundles are superimposed and cut while the width directions thereof are coincident with each other, the split positions in the width direction in a laminated body of the superimposed fiber bundles are coincident with each other, and thus unevenness in weight in a fiber-reinforced resin molding material is likely to occur. On the other hand, in an embodiment in which a plurality of fiber bundles are superimposed and cut while the width directions are deviated, the split positions in the width direction in a laminated body of the superimposed fiber bundles are also deviated, and thus unevenness in weight in a fiber-reinforced resin molding material is less likely to occur.

<Pasting and Impregnating Step>

The original sheet R in which the fiber-reinforced resin molding material is interposed between the first carrier sheet C1 and the second carrier sheet C2 is obtained in the same manner as in the pasting and impregnating step in the first embodiment.

Also in the present embodiment, in the integrated material manufacturing step, the consecutive fiber bundle f1 is opened and the separated fiber bundle f3 is collected once to obtain an integrated material, and then, in the spraying step, the fiber bundle aggregate is drawn out from the integrated material and then used. Therefore, it is possible to control the process speeds in the spraying step and the pasting and impregnating step regardless of the process speed in the integrated material manufacturing step, and the opening operation of the fiber bundle becomes a rate-determining process so that it is possible to suppress a decrease in the process speeds in the spraying step and the pasting and impregnating step.

Further, as described above, when the cut fiber bundles f4 obtained by cutting the fiber bundle f3, which has been opened in a flat state and separated, are consecutively sprayed on the first resin sheet S1 in a random fiber orientation, a fiber-reinforced resin molding material with excellent strength properties and with less eccentrically-located part of the resin can be obtained and a fiber-reinforced resin molding material with less unevenness in weight and less unevenness in physical properties is obtained.

Further, also in the present embodiment, the opened fiber bundle may be guided by the godet roll, and then separation may be performed to obtain the separated fiber bundle.

Specifically, for example, the method for manufacturing a fiber-reinforced resin molding material of the invention may be a manufacturing method using a manufacturing device in which the first manufacturing device 1 in the manufacturing device 200 is changed to the first manufacturing device 1A illustrated in FIG. 4.

According to this, even when fluff occurs in the fiber bundle at the time of separation, a trouble caused by the winding to a roll is less likely to occur.

Third Embodiment

In the method for manufacturing a fiber-reinforced resin molding material of the invention, the opened fiber bundle may be collected in the integrated material manufacturing step, and the opened fiber bundle which has been collected (integrated material) may be drawn out, separated, cut, and sprayed in the spraying step.

In the first embodiment and the second embodiment, the opened fiber bundle is separated and the separated fiber bundle is collected in the integrated material manufacturing step, but separation may be performed in the spraying step.

That is, in the present embodiment, the opened fiber bundle f2 is collected as a fiber bundle aggregate in the collecting unit to constitute an integrated material.

(Device for Manufacturing Fiber-Reinforced Resin Molding Material)

As the method for manufacturing a fiber-reinforced resin molding material of the invention in which the opened fiber bundle is collected in the integrated material manufacturing step, and the opened fiber bundle which has been collected (integrated material) is drawn out, separated, cut, and sprayed in the spraying step, for example, a method using a device for manufacturing a fiber-reinforced resin molding material 300 illustrated in FIG. 5 and FIG. 6 (hereinafter, also simply referred to as the "manufacturing device 300") is exemplified. The same parts in FIG. 5 and FIG. 6 as in FIG. 1 and FIG. 2 are denoted by the same reference numerals and descriptions thereof are omitted.

The manufacturing device 300 includes a first manufacturing device 4 and a second manufacturing device 5.

The first manufacturing device 4 includes the opening unit 50, a guide roll 40, and the collecting unit 54. The first manufacturing device 4 has the same configuration as in the first manufacturing device 1, except that the guide roll 40 is provided instead of the separating unit 52. The fiber bundles f2 (fiber bundle aggregates) obtained by opening the plurality of elongated, that is, consecutive fiber bundles f1 drawn out from the bobbin B1 by the opening unit 50 are guided to the collecting unit 54 by the guide roll 40 and then wound up the bobbin B2.

The second manufacturing device 5 includes the separating unit 52, the first carrier sheet supplying unit 11, the first conveying unit 20, the first coating unit 12, the cutting machine 13, the second carrier sheet supplying unit 14, the second conveying unit 28, the second coating unit 15, and the impregnating unit 16. The second manufacturing device 5 has the same configuration as in the second manufacturing device 2, except that the separating unit 52 is further provided.

The separating unit 52 is provided in the previous stage of the cutting machine 13. The opened fiber bundle f2 (fiber bundle aggregate) drawn out from the bobbin B2 is guided by the guide roll 41 and supplied to the separating unit 52, and the fiber bundle f3 separated in the separating unit 52 is supplied to the cutting machine 13.

(Method for Manufacturing Fiber-Reinforced Resin Molding Material)

Hereinafter, a case where the manufacturing device 300 is used will be described as an example of the method for manufacturing a fiber-reinforced resin molding material of the invention.

<Integrated Material Manufacturing Step>

In the first manufacturing device 4, the consecutive fiber bundle f1 is drawn out from the bobbin B1, and the consecutive fiber bundle f1 is caused to sequentially pass above and below each opening bar 17 in a zig-zag manner in the opening unit 50 to obtain the opened consecutive fiber bundle f2 which is spread in the width direction by opening and is in a flat state.

Subsequently, the opened fiber bundle f2 is guided to the collecting unit 54 by the guide roll 40 and collected as an integrated material by being wound up the bobbin B2. The guide roll 40 may be used in plural.

When the consecutive fiber bundle f2 that are opened is wound up the bobbin B2, winding may be performed by superimposing paper or a film on the opened fiber bundle f2. According to this, since paper or a film is inserted between the opened fiber bundles f2 to be wound up the bobbin B2, it is easy to suppress a case in which fibers of the opened fiber bundle f2 to be wound up are entangled and thus the fiber bundle f2 is difficult to draw out.

<Spraying Step>

In the second manufacturing device 5, the elongated, that is, consecutive first carrier sheet C1 is drawn out from the first original sheet roll R1 and supplied to the first conveying unit 20 by the first carrier sheet supplying unit 11, and the paste P containing the first resin is coated in a predetermined thickness by the first coating unit 12 to form the first resin sheet S1 containing the first resin. The first resin sheet S1 on the first carrier sheet C1 is moved by conveying the first carrier sheet C1 by the first conveying unit 20.

Further, the consecutive fiber bundle f2 that are opened is drawn out from the bobbin B2, the opened fiber bundle f2 is caused to pass through the plurality of rotary blades 18 while the plurality of rotary blades 18 are rotated in the separating unit 52, the plurality of blades 18a are intermittently stuck in the opened fiber bundle f2, and the opened fiber bundle f2 is split in the width direction to obtain consecutive fiber bundles f3 that are separated. Subsequently, the separated fiber bundles f3 are supplied to the cutting machine 13 by the plurality of godet rolls 19.

In the cutting machine 13, cutting at an interval in the longitudinal direction thereof is performed to the consecutive fiber bundles f3 that are separated to have a predetermined length, and the cut fiber bundles f4 are caused to be dropped and sprayed on the first resin sheet S1. According to this, a sheet-shaped fiber bundle group F in which the plurality of cut fiber bundles f4 are separated in a state of being opened and are sprayed in a random fiber orientation is consecutively formed on the moving first resin sheet S1.

<Pasting and Impregnating Step>

The original sheet R in which the fiber-reinforced resin molding material is interposed between the first carrier sheet C1 and the second carrier sheet C2 is obtained in the same manner as in the pasting and impregnating step in the first embodiment.

In the present embodiment, in the integrated material manufacturing step, the consecutive fiber bundle f1 is opened and the opened fiber bundle f2 (fiber bundle aggregate) is collected once, and then, in the spraying step, the opened fiber bundle f2 (fiber bundle aggregate) is drawn out and then used. Therefore, it is possible to control the process speeds in the spraying step and the pasting and impregnating step regardless of the process speed in the integrated material manufacturing step, and the opening operation of the fiber bundle becomes a rate-determining process so that it is possible to suppress a decrease in the process speeds in the spraying step and the pasting and impregnating step.

Further, as described above, when the cut fiber bundles f4 obtained by cutting the fiber bundle f3, which has been opened in a flat state and separated, are consecutively sprayed on the first resin sheet S1 in a random fiber orientation, a fiber-reinforced resin molding material with excellent strength properties and with less eccentrically-located part of the resin can be obtained.

Incidentally, in a case where separation of the opened fiber bundle is performed in the spraying step, the embodiment thereof is not limited to an embodiment in which a fiber bundle is separated, and then the separated fiber bundles are guided to a cutting machine by a godet roll, like the embodiment using the manufacturing device 300.

For example, the opened fiber bundle may be guided by a godet roll and then subjected to separation, and thus the separated fiber bundles may be obtained.

According to this, even when fluff occurs in the fiber bundle at the time of separation, a trouble caused by the winding to a roll is less likely to occur. In addition, it is easy to suppress a case where the separated fiber bundles come in close contact with each other again when being guided by the godet roll.

Figure 8:
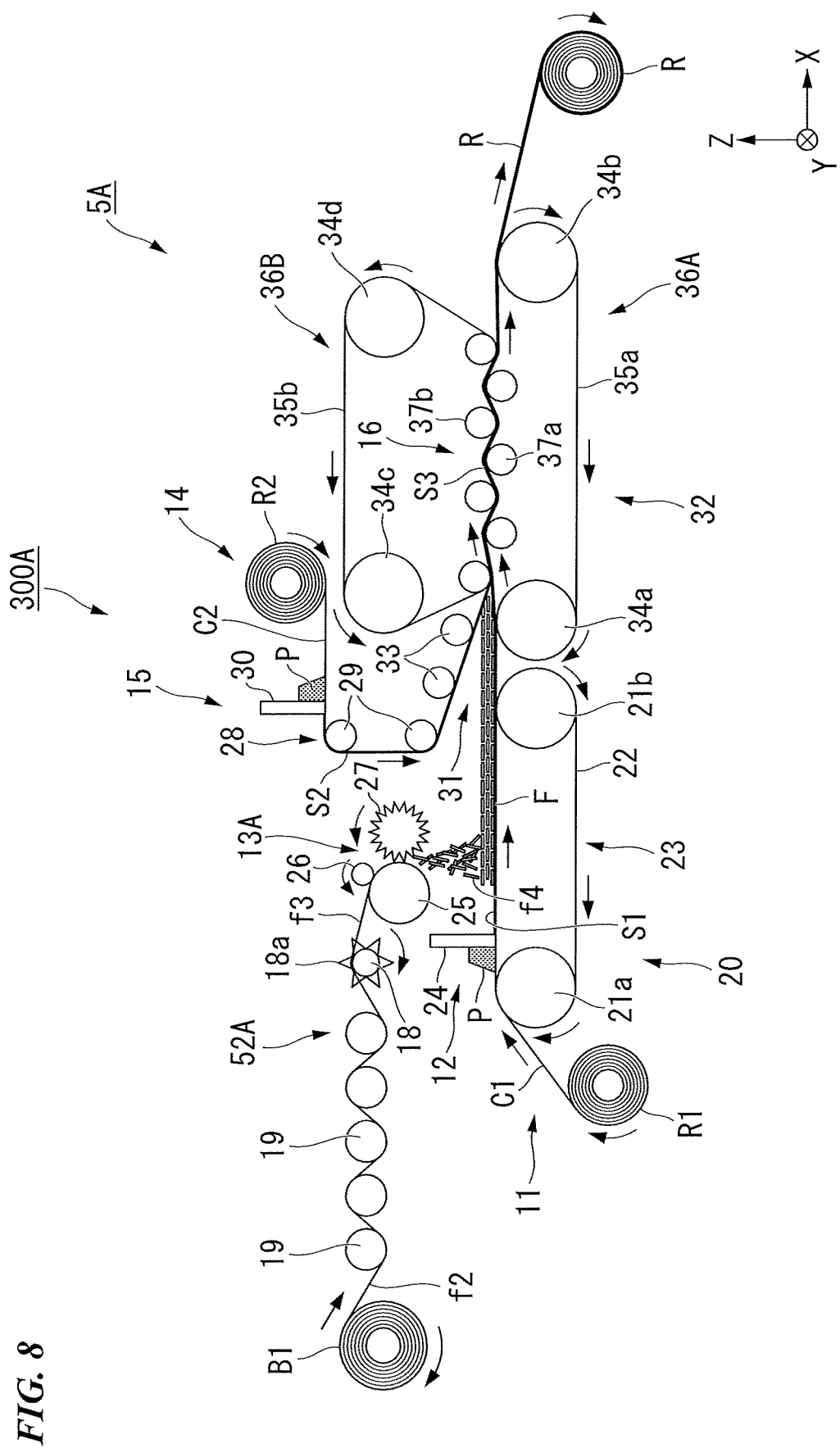
FIG. 8 is a schematic configuration diagram illustrating another exemplary step of the method for manufacturing a fiber-reinforced resin molding material and a part of the manufacturing device of the invention.

Specifically, for example, the method for manufacturing a fiber-reinforced resin molding material of the invention may be a method using a manufacturing device 300A, illustrated in FIG. 8, having the same configuration as in the manufacturing device 300, except that a second manufacturing device 5A in which the separating unit 52 is changed to the separating unit 52A is provided.

Figure 6:
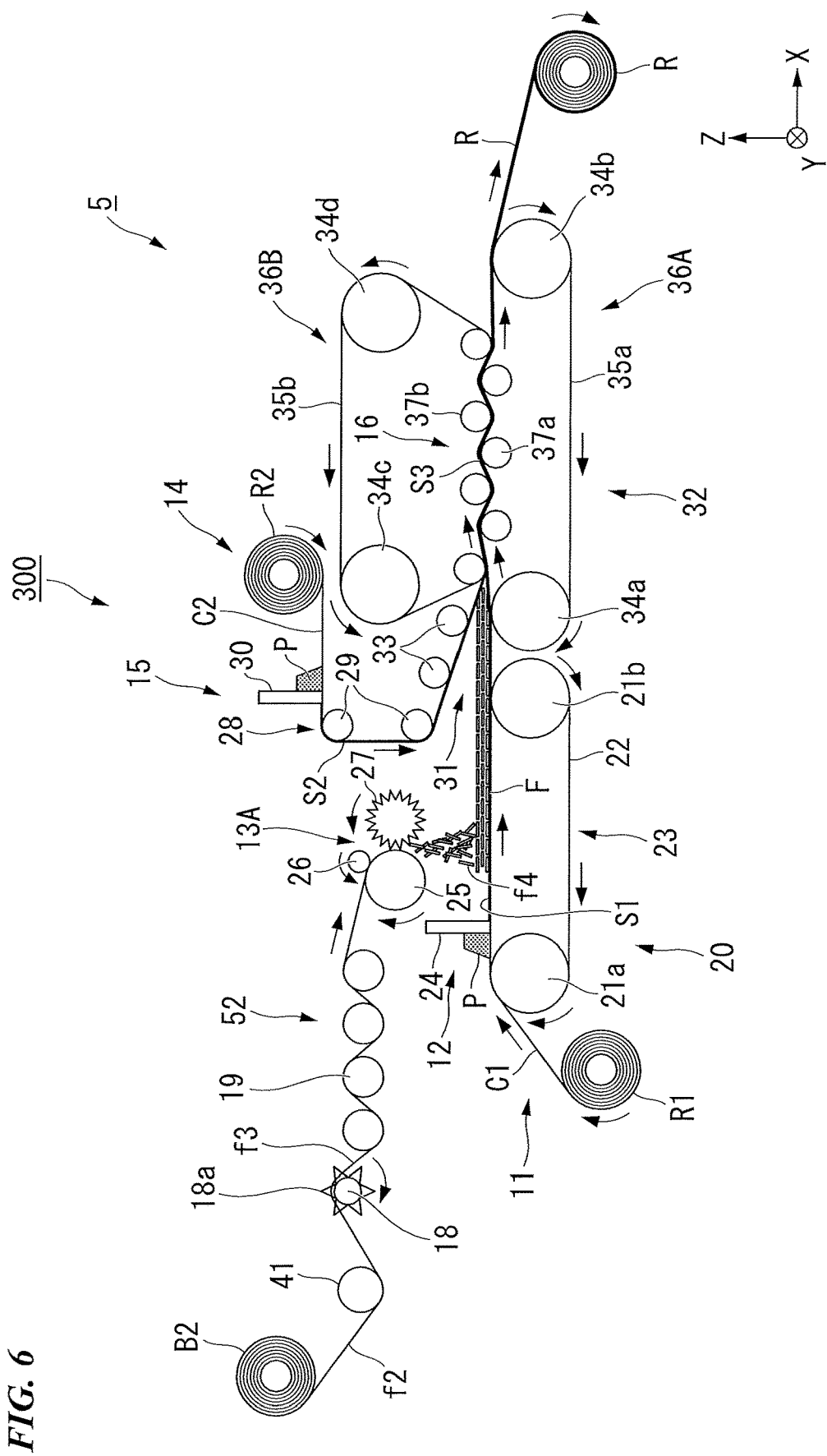
FIG. 6 is a schematic configuration diagram illustrating another exemplary step of the method for manufacturing a fiber-reinforced resin molding material and a part of the manufacturing device of the invention.

The same parts in FIG. 8 as in FIG. 6 are denoted by the same reference numerals and descriptions thereof are omitted.

The separating unit 52A has the same configuration as in the separating unit 52, except that the plurality of rotary blades 18 are disposed in the latter stage of the plurality of godet rolls 19.

By using such a manufacturing device 300A, the opened fiber bundle f2 which has been collected is drawn out and guided to the rotary blade 18 by a godet roll, and the opened fiber bundle f2 is split in the width direction by separation so that the separated fiber bundles f3 can be obtained.

Fourth Embodiment

Also in the method in which the opened fiber bundle is collected in the integrated material manufacturing step, and the opened fiber bundle which has been collected (integrated material) is drawn out, separated, cut, and sprayed in the spraying step, it is preferable that the respective fiber bundle aggregates are drawn out from the plurality of integrated materials obtained in the integrated material manufacturing step, the respective drawn fiber bundle aggregates are superimposed and cut at an interval in the longitudinal direction thereof to obtain the cut fiber bundles.

(Device for Manufacturing Fiber-Reinforced Resin Molding Material)

Figure 5:
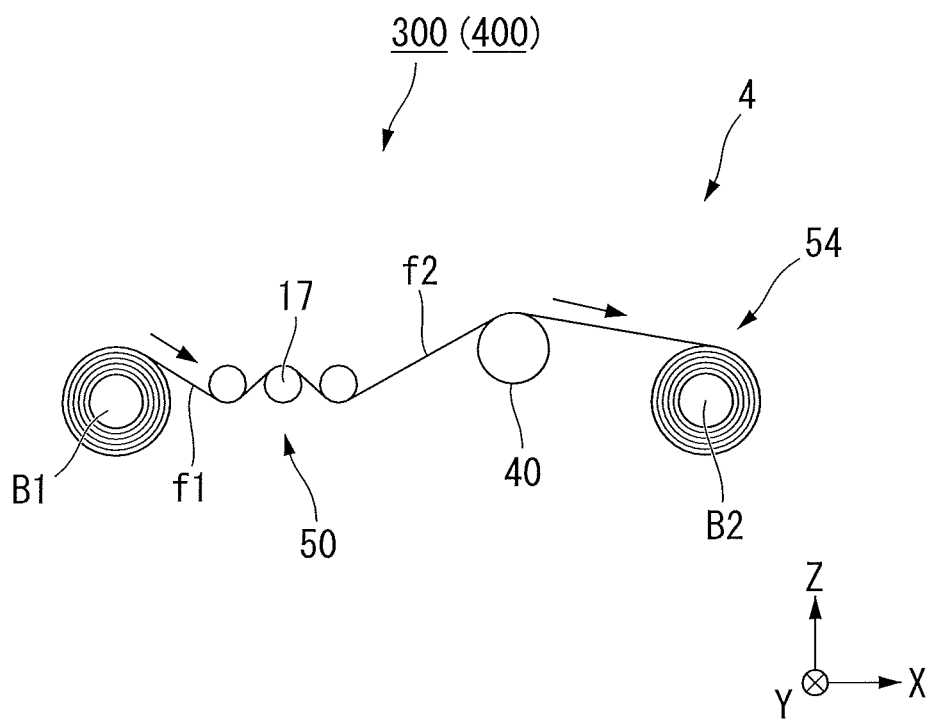
FIG. 5 is a schematic configuration diagram illustrating another exemplary step of the method for manufacturing a fiber-reinforced resin molding material and a part of the manufacturing device of the invention.
Figure 7:
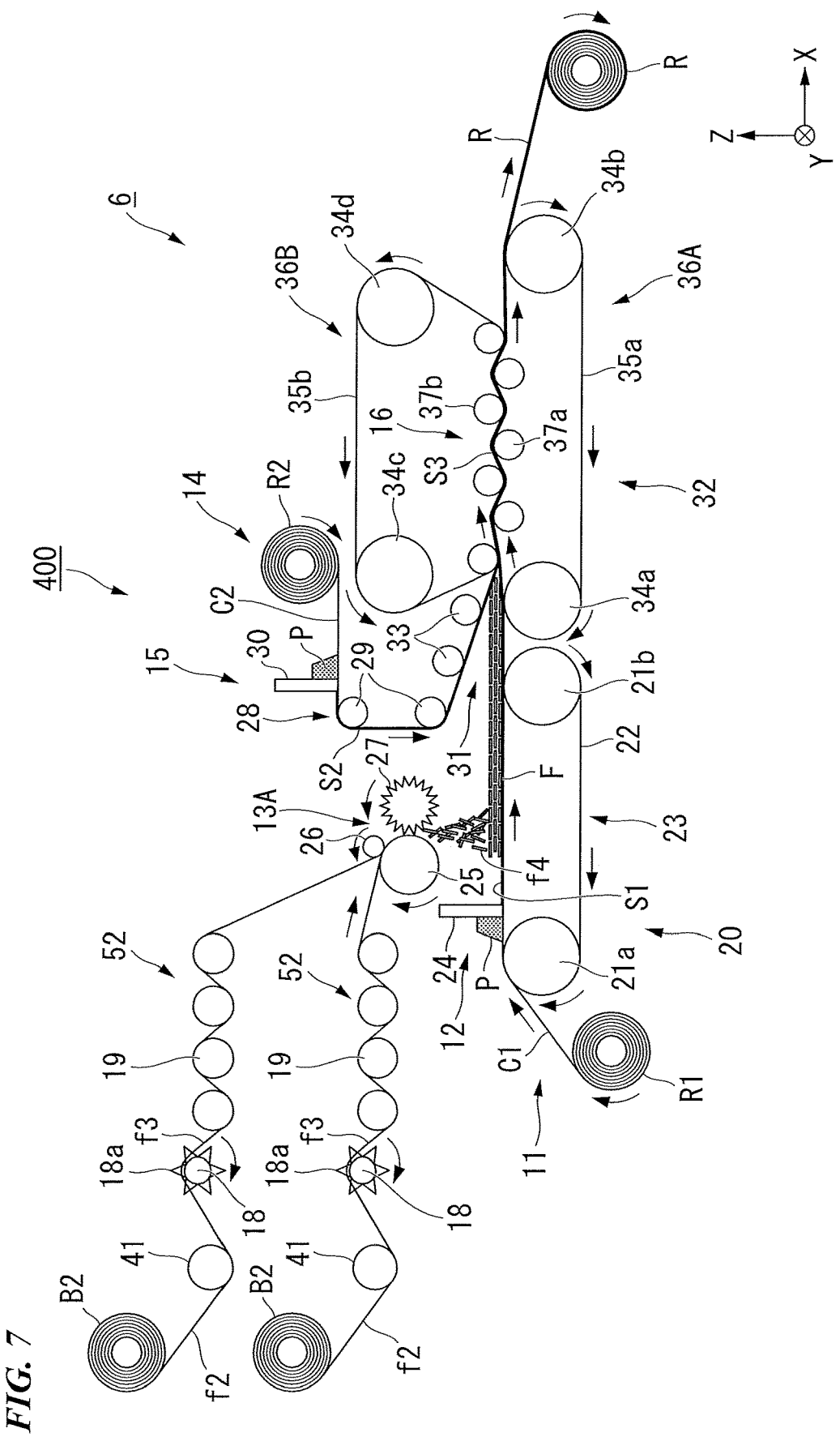
FIG. 7 is a schematic configuration diagram illustrating another exemplary step of the method for manufacturing a fiber-reinforced resin molding material and a part of the manufacturing device of the invention.

In the method in which the opened fiber bundle is collected in the integrated material manufacturing step, and the opened fiber bundle which has been collected (integrated material) is drawn out, separated, cut, and sprayed in the spraying step, as the method for manufacturing a fiber-reinforced resin molding material of the invention in which the respective fiber bundle aggregates are drawn out from the plurality of integrated materials obtained in the integrated material manufacturing step, the respective drawn fiber bundle aggregates are superimposed and cut at an interval in the longitudinal direction thereof to obtain the cut fiber bundles, for example, a method using a device for manufacturing a fiber-reinforced resin molding material 400 illustrated in FIG. 5 and FIG. 7 (hereinafter, also simply referred to as the "manufacturing device 400") is exemplified. The same parts in FIG. 7 as in FIG. 6 are denoted by the same reference numerals and descriptions thereof are omitted.

The manufacturing device 400 includes the first manufacturing device 4 and a second manufacturing device 6. That is, the manufacturing device 400 has the same configuration as in the manufacturing device 300, except that the second manufacturing device 6 is provided instead of the second manufacturing device 5.

The second manufacturing device 6 has the same configuration as in the second manufacturing device 5, except that, as illustrated in FIG. 7, the plurality of opened fiber bundles f2 are drawn out from the integrated materials collected in the plurality of bobbins B2, each of the opened fiber bundles f2 which have been drawn out is superimposed and supplied to the cutting machine 13, and the respective fiber bundle aggregates are cut at the same time.

(Method for Manufacturing Fiber-Reinforced Resin Molding Material)

Hereinafter, the case of using the manufacturing device 400 will be described as an example of the method for manufacturing a fiber-reinforced resin molding material of the invention.

<Integrated Material Manufacturing Step>

The integrated material manufacturing step in the fourth embodiment is performed in the same manner as in the integrated material manufacturing step in the third embodiment.

That is, in the present embodiment, the integrated material is configured by collecting the opened fiber bundles f2 as a fiber bundle aggregate in the collecting unit.

<Spraying Step>

In the second manufacturing device 6, similarly to the third embodiment, the elongated, that is, consecutive first carrier sheet C1 is drawn out from the first original sheet roll R1 and supplied to the first conveying unit 20 by the first carrier sheet supplying unit 11, and the paste P containing the first resin is coated in a predetermined thickness by the first coating unit 12 to form the first resin sheet S1 containing the first resin. The first resin sheet S1 on the first carrier sheet C1 is moved by conveying the first carrier sheet C1 by the first conveying unit 20.

Further, the plurality of consecutive fiber bundles f2 that are opened are drawn out from the plurality of bobbins B2 and separated by the separating unit 52 and superimposed, cutting at an interval in the longitudinal direction thereof is performed in the cutting machine 13 to have a predetermined length, and the cut fiber bundles f4 are caused to be dropped and sprayed on the first resin sheet S1. According to this, a sheet-shaped fiber bundle group F in which the plurality of cut fiber bundles f4 are separated in a state of being opened and are sprayed in a random fiber orientation is consecutively formed on the moving first resin sheet S1.

Also in the present embodiment, in a case where the plurality of fiber bundle aggregates each drawn out from the plurality of integrated materials in the spraying step are superimposed and cutting at an interval in the longitudinal direction thereof is performed to obtain the cut fiber bundles, it is preferable to perform cutting in a state where the plurality of fiber bundle aggregates are superimposed while the width directions thereof are deviated, as compared to an embodiment in which the plurality of fiber bundle aggregates are superimposed such that the width directions thereof are coincident with each other and then cutting is performed.

By cutting the plurality of fiber bundle aggregates in a state where the plurality of fiber bundle aggregates are superimposed while the width directions thereof are deviated, it is possible to increase the manufacturing speed and it is easy to suppress occurrence of unevenness in weight of fiber-reinforced resin molding materials to be obtained.

<Pasting and Impregnating Step>

The original sheet R in which the fiber-reinforced resin molding material is interposed between the first carrier sheet C1 and the second carrier sheet C2 is obtained in the same manner as in the pasting and impregnating step in the first embodiment.

Also in the present embodiment, in the integrated material manufacturing step, the consecutive fiber bundle f1 is opened and the opened fiber bundle f2 is collected once to obtain an integrated material, and then, in the spraying step, the fiber bundle aggregate is drawn out from the integrated material and then used. Therefore, it is possible to control the process speeds in the spraying step and the pasting and impregnating step regardless of the process speed in the integrated material manufacturing step, and the opening operation of the fiber bundle becomes a rate-determining process so that it is possible to suppress a decrease in the process speeds in the spraying step and the pasting and impregnating step.

Further, as described above, when the cut fiber bundles f4 obtained by cutting the fiber bundle f3, which has been opened in a flat state and separated, are consecutively sprayed on the first resin sheet S1 in a random fiber orientation, a fiber-reinforced resin molding material with excellent strength properties and with less eccentrically-located part of the resin can be obtained and a fiber-reinforced resin molding material with less unevenness in weight and less unevenness in physical properties is obtained.

Further, also in the present embodiment, the opened fiber bundle may be guided by the godet roll, and then separation may be performed to obtain the separated fiber bundle.

Specifically, for example, the method for manufacturing a fiber-reinforced resin molding material of the invention may be a manufacturing method using a manufacturing device in which the separating unit 52 in the manufacturing device 400 is changed to the separating unit 52A.

According to this, even when fluff occurs in the fiber bundle at the time of separation, a trouble caused by the winding to a roll is less likely to occur.

In the method for manufacturing a fiber-reinforced resin molding material of the invention, from the viewpoint that the device configuration becomes simpler, a method of collecting a separated fiber bundle, which has been subjected to separation after opening, as in the first embodiment and the second embodiment is more preferable than a method of performing separation to an opened fiber bundle drawn out from an integrated material as in the third embodiment and the fourth embodiment.

As described above, in the method for manufacturing a fiber-reinforced resin molding material of the invention, the fiber bundle is collected once after being opened, and thus the opening operation of the fiber bundle becomes a rate-determining process. Therefore, it is possible to suppress a decrease in the process speeds in the spraying step and the pasting and impregnating step.

Moreover, in the method for manufacturing a fiber-reinforced resin molding material of the invention, a fiber-reinforced resin molding material can be manufactured at low cost with high productivity, and when cut fiber bundles, which are obtained by cutting fiber bundles obtained by opening a fiber bundle in a flat state and separating the opened fiber bundle, are consecutively sprayed on the first resin sheet in a random fiber orientation, it is possible to obtain a fiber-reinforced resin molding material with excellent strength properties and with less eccentrically-located part of the resin.

The method for manufacturing a fiber-reinforced resin molding material and the device for manufacturing a fiber-reinforced resin molding material of the invention are useful particularly in the case of using a fiber bundle having a large number of filaments, called a large tow.

Incidentally, the method for manufacturing a fiber-reinforced resin molding material of the invention is not limited to the above-described methods. For example, the method of collecting the opened fiber bundle in the integrated material manufacturing step is not limited to winding, and a well-known collecting method such as throwing-into may be also employed.

Example 1

A carbon fiber bundle (trade name "TRW40 50L," manufactured by Mitsubishi Rayon Co., Ltd.) was used as a consecutive fiber bundle.

With respect to 100 parts by mass of an epoxy acrylate resin (product name: Neopol 8051, manufactured by Japan U-Pica Company Ltd.) as a thermosetting resin, 0.5 part by mass of a 75% solution of 1,1-di(t-butylperoxy)cyclohexane (product name: Perhexa C-75, manufactured by NOF Corporation) and 0.5 part by mass of a 74% solution of t-butylperoxy isopropyl carbonate (product name: Kayacarbon BIC-75, manufactured by Kayaku Akzo Corporation) were added as curing agents, 0.35 part by mass of a phosphate ester-based derivative composition (product name: MOLD WIZ INT-EQ-6, manufactured by Axel Plastics Research Laboratories Inc.) was added as an internal release agent, 15.5 parts by mass of modified diphenyl methane diisocyanate (product name: Cosmonate LL, manufactured by Mitsui Chemicals, Inc.) was added as a thickener, 0.02 part by mass of 1,4-benzoquinone (product name: p-benzoquinone, manufactured by Wako Pure Chemical Industries, Ltd.) was added as a stabilizer, and then these were sufficiently mixed and stirred to thereby obtain a paste.

The plurality of consecutive fiber bundles drawn out from the bobbin B1 were disposed in the width direction and opened by the opening unit 50 up to a width of the fiber bundle of 25 mm in the first manufacturing device 1, and the fiber bundles were separated to be split into halves by the separating unit 52 such that the value of a/(a+b) was adjusted to 0.98 to obtain a fiber bundle aggregate, thereby obtaining an integrated material collected by the integrating unit at a speed of 40 m/min.

The paste was coated on the first carrier sheet, which was being conveyed, to form a first resin sheet having a thickness of 0.45 mm. In addition, the integrated material collected by the integrating unit (the carbon fiber bundle aggregate having a thickness of 0.1 mm and a width of 12.5 mm subjected to opening and separation) was cut with a cutting machine such that the value of a/L was adjusted to 1.1, and then was caused to be dropped as a chopped fiber bundle having an average fiber length of 25.4 mm, thereby forming a sheet-shaped fiber bundle group having a thickness of 1.3 mm. The line speed was set to 1.5 m/min.

The paste was coated on the second carrier sheet, which was being conveyed in a direction opposite to that of the first carrier sheet, above the first carrier sheet to form a second resin sheet having a thickness of 0.45 mm, and while the conveyance direction was inverted, the second resin sheet was pasted and laminated onto the sheet-shaped fiber bundle group. Further, impregnating was performed to the laminated body of the first resin sheet, the sheet-shaped fiber bundle group, and the second resin sheet to obtain a sheet-shaped fiber-reinforced resin molding material having a thickness of 2 mm.

The obtained fiber-reinforced resin molding material, which had been cured for 1 week, was cut into 250 mm×250 mm, the conveyance direction (MD direction) of the fiber-reinforced resin molding material in the device for manufacturing a fiber-reinforced resin molding material was aligned in a die for molding a panel having a fitting portion at the end portion thereof (300 mm×300 mm×2 mm, chromium-plated surface finishing), two sheets of the fiber-reinforced resin molding materials were put into the center of the die, thereby obtaining a fiber-reinforced resin material molded article (fiber content: 53 wt %).

The tensile strength of the obtained molded article was a high strength of 150 Mpa.

Example 2

A carbon fiber bundle (trade name "TR50S 15L", manufactured by Mitsubishi Rayon Co., Ltd.) was used as a consecutive fiber bundle.

The width of the fiber bundle was opened up to 15 mm by the opening unit in the same process as in Example 1, the fiber bundle was separated to be split into halves by the separating unit such that the value of a/(a+b) was adjusted to 0.92 to obtain a fiber bundle aggregate, thereby obtaining an integrated material collected by the integrating unit at a speed of 40 m/min.

The paste obtained in Example 1 was coated on the first carrier sheet, which was being conveyed, to form a first resin sheet having a thickness of 0.45 mm. In addition, the integrated material collected by the integrating unit (the carbon fiber bundle aggregate having a thickness of 0.05 mm and a width of 7.5 mm subjected to opening and separation) was cut with a cutting machine such that the value of a/L was adjusted to 5, and then was caused to be dropped as a chopped fiber bundle having an average fiber length of 25.4 mm, thereby forming a sheet-shaped fiber bundle group having a thickness of 1.4 mm. The line speed was set to 1.5 m/min.

A sheet-shaped fiber-reinforced resin molding material having a thickness of 2.1 mm was obtained by pasting and laminating the second resin sheet onto the sheet-shaped fiber bundle group and then performing impregnating to the laminated body in the same manner as in Example 1.

A fiber-reinforced resin material molded article (fiber content: 57 wt %) was obtained by performing molding using the obtained fiber-reinforced resin molding material, which had been cured for 1 week, under the same condition as in Example 1.

The tensile strength of the obtained molded article was a high strength of 240 MPa.

EXPLANATIONS OF LETTERS OR NUMERALS 1, 1A, 4 FIRST MANUFACTURING DEVICE
2, 3, 5, 5A, 6 SECOND MANUFACTURING DEVICE
10 OPENING AND SEPARATING UNIT
11 FIRST CARRIER SHEET SUPPLYING UNIT
12 FIRST COATING UNIT
13 CUTTING MACHINE
14 SECOND CARRIER SHEET SUPPLYING UNIT
15 SECOND COATING UNIT
16 IMPREGNATING UNIT
20 FIRST CONVEYING UNIT
28 SECOND CONVEYING UNIT
50 OPENING UNIT
52, 52A SEPARATING UNIT
54 COLLECTING UNIT
100, 200, 300, 300A, 400 DEVICE FOR MANUFACTURING FIBER-REINFORCED RESIN MOLDING MATERIAL

The invention claimed is:

1. A method for manufacturing a sheet-shaped fiber-reinforced resin molding material comprising a plurality of cut fiber bundles and a resin impregnated between filaments of the plurality of the cut fiber bundles, the method comprising:

drawing out from a bobbin and opening a consecutive fiber bundle to form an open fiber bundle which is spread by the opening in a width direction and is in a flat state, splitting the open fiber bundle in the width direction, thereby obtaining a plurality of separated fiber bundles that form a fiber bundle aggregate, wherein the separated fiber bundles of the fiber bundle aggregate are partially and intermittently separated at an interval in a longitudinal direction of the consecutive fiber bundle, wherein an intermittent separation in the longitudinal direction of the consecutive fiber bundle is performed such that the following condition (3) is satisfied:

$$0.9 \leq a/(a+b) < 1 \tag{3},$$

wherein a represents a length of a separated part in the consecutive fiber bundle and b represents a length between intermittently separated parts in the consecutive fiber bundle, collecting the fiber bundle aggregate, thereby obtaining at least one integrated material, drawing the separated fiber bundles of the fiber bundle aggregate out from the at least one integrated material, cutting the drawn and separated fiber bundles at an interval in a longitudinal direction, thereby obtaining the plurality of the cut fiber bundles, and dropping and spreading the plurality of the cut fiber bundles on a first resin sheet comprising a first resin to form a sheet-shaped fiber bundle group; and laminating and pressurizing a second resin sheet comprising a second resin on the sheet-shaped fiber bundle group and impregnating the sheet-shaped fiber bundle group with the first resin and the second resin to obtain the sheet-shaped fiber-reinforced resin molding material.

2. The method of claim 1, wherein the intermittent separation is performed such that the following condition (1) is satisfied:

$$1 \leq a/L \tag{1},$$

wherein L represents the interval at which the drawn and separated fiber bundles are cut.

3. The method of claim 2, comprising performing the intermittent separation and the cutting such that the following condition (2) is satisfied:

$$a/L \leq 10 \tag{2}.$$

4. The method of claim 1, wherein the splitting of the open fiber bundle further comprises guiding the open fiber bundle with a godet roll.

5. The method according to claim 1, wherein:

collecting the fiber bundle aggregate comprises collecting the fiber bundle aggregate to obtain at least two integrated materials, and drawing out the separated fiber bundles comprises drawing out separated fiber bundles out of each of the at least two integrated materials, and the method further comprises superimposing the separated fiber bundles drawn out of each of the at least two integrated materials, wherein cutting the drawn and separated fiber bundles comprises cutting the superimposed separated fiber bundles at the interval in the longitudinal direction of the separated fiber bundles to obtain the plurality of the cut fiber bundles.

6. The method of claim 5, comprising:

superimposing the separated fiber bundles drawn out of each of the at least two integrated materials is performed with each respective separated fiber bundle drawn out of the at least two integrated materials being deviated in a width direction from the other respective separated fiber bundles drawn out of the at least two integrated materials.

* * * * *